United States Patent
Biquez et al.

[11] Patent Number: 6,121,566
[45] Date of Patent: Sep. 19, 2000

[54] SWITCHGEAR FOR A POWER STATION GENERATOR AND A TRANSFORMER, WITH A THREE-POSITION DISCONNECTOR CONNECTED TO THE TRANSFORMER

[75] Inventors: François Biquez, Brignais; Jean-Marc Willieme, La Mulatiere, both of France

[73] Assignee: GEC Alsthom T&D SA, Paris, France

[21] Appl. No.: 09/198,049

[22] Filed: Nov. 23, 1998

[30] Foreign Application Priority Data

Nov. 24, 1997 [FR] France ..................... 97 14708

[51] Int. Cl.⁷ .......................... H01H 33/02; H02B 5/00; H02P 9/00
[52] U.S. Cl. ..................... 218/7; 218/79; 218/80; 361/605; 322/100
[58] Field of Search ................... 218/1, 2, 7, 8, 218/12, 43, 45, 55, 79, 80, 84, 63, 67; 361/605–618; 322/100, 44, 90; 307/51, 52, 63, 69, 71, 78, 80, 85–87, 112, 116, 119, 125

[56] References Cited

U.S. PATENT DOCUMENTS

| | | | |
|---|---|---|---|
| 3,745,281 | 7/1973 | Yoshioka | 218/63 |
| 4,250,535 | 2/1981 | Adolph et al. | 361/618 |
| 5,334,927 | 8/1994 | Widenhorn | 322/100 |
| 5,796,060 | 8/1998 | Fuchsle et al. | 218/79 |

FOREIGN PATENT DOCUMENTS 0 567 773 A2  11/1993  European Pat. Off. .

*Primary Examiner*—J. R. Scott
*Attorney, Agent, or Firm*—Sughrue, Mion, Zinn, Macpeak & Seas, PLLC

[57] ABSTRACT

The switchgear comprises a circuit breaker connected between a generator and a transformer, together with a disconnector connected between the circuit breaker and the transformer, the disconnector having a fixed pole common to three positions: a first position and a second position respectively for connecting together or isolating the transformer and the circuit breaker when the circuit breaker is respectively closed or open; and a third position for grounding the fixed pole when the circuit breaker is open. The fixed pole of the disconnector is electrically connected to the transformer, thereby making it possible to interconnect or to isolate or to ground the tranformer while using only one disconnector included in the switchgear.

1 Claim, 1 Drawing Sheet

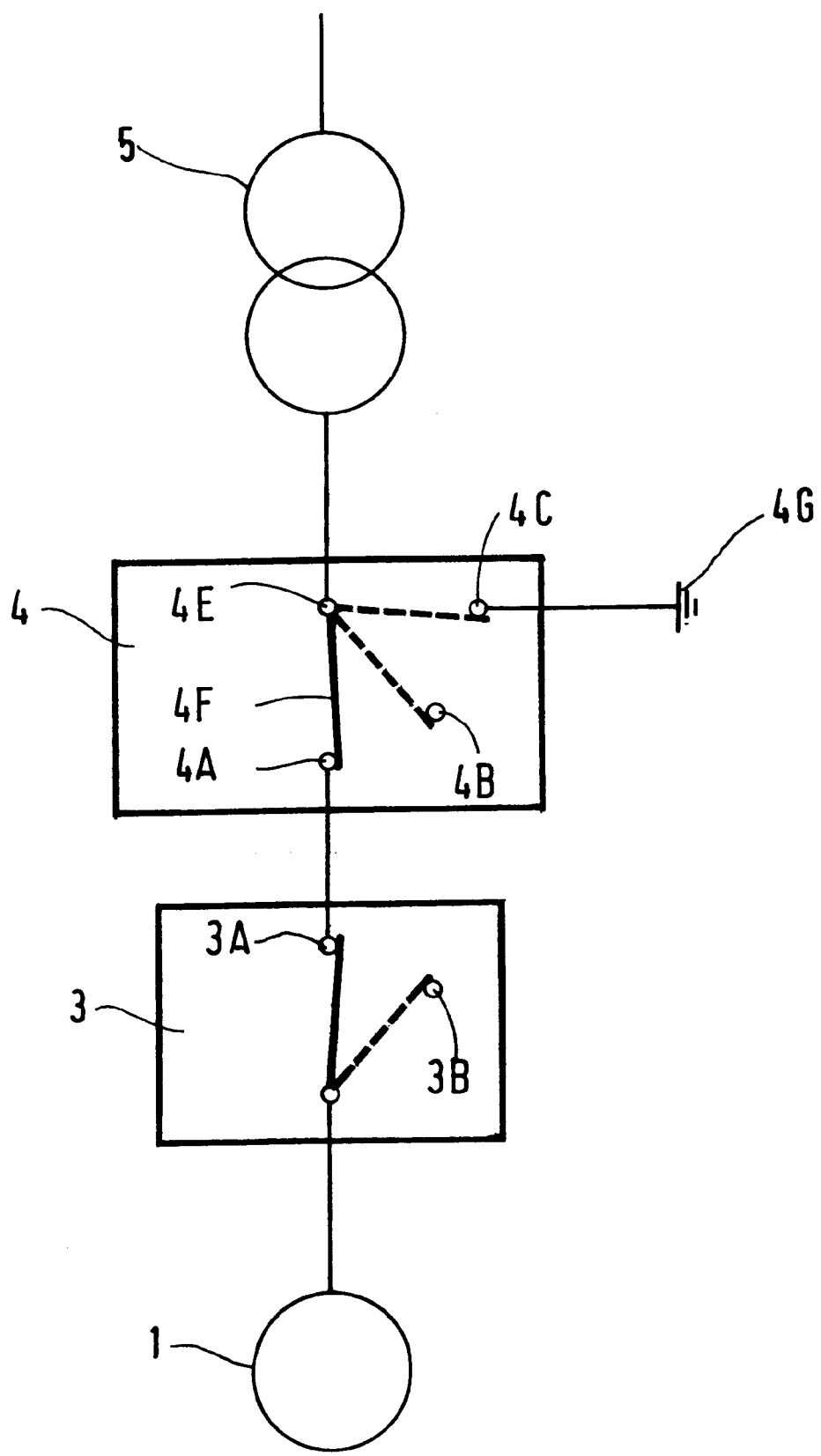

SWITCHGEAR FOR A POWER STATION GENERATOR AND A TRANSFORMER, WITH A THREE-POSITION DISCONNECTOR CONNECTED TO THE TRANSFORMER

The present invention relates to switchgear between a power station generator and a transformer and a disconnector of a medium voltage or high voltage network. The switchgear comprises a generator circuit breaker connected between the generator and the transformer, together with a disconnector connected between the generator circuit breaker and the transformer, the disconnector having a fixed pole connected to a moving contact movable relative to said fixed pole to open or to close the disconnector, or to connected the fixed pole to a ground terminal.

BACKGROUND OF THE INVENTION

In a known manner, such a generator circuit breaker is opened to interrupt the electrical circuit that connects the generator to the transformer, and that is in general three-phase. The disconnector, which has no interrupting capability, is subsequently opened to make it absolutely safe to work on the circuit breaker which is isolated.

In Document EP A 0 567 773 A2, the disconnector has a fixed pole which is connected to the generator circuit breaker. In order to make it possible to work on the transformer, provision is made to dispose an additional ground disconnector for discharging the transformer after it has been isolated from the generator by opening the circuit breaker and subsequently opening the disconnector, and from the medium voltage or high voltage network by opening a network circuit breaker.

OBJECTS AND SUMMARY OF THE INVENTION

An object of the invention is to provide switchgear that is simplified, in particular with respect to the additional ground disconnector.

The basic idea of the invention is to dispose a single disconnector which includes a grounding capability and which is connected to the transformer.

To this end, the invention provides switchgear between a power station generator and a transformer of a medium voltage or high voltage network, said switchgear comprising a generator circuit breaker connected between the generator and the transformer, together with a disconnector connected between the generator circuit breaker and the transformer, the disconnector having a fixed pole connected to a moving contact movable relative to said fixed pole to open or to close the disconnector, or to connect the fixed pole to a ground terminal, wherein the fixed pole of the disconnector is connected to the transformer.

In order to work on the transformer, the generator circuit breaker is opened, and then the disconnector is opened. A network circuit breaker connected between the transformer and the network is then opened, and, finally, the fixed pole of the disconnector is connected to the ground terminal via the moving contact to discharge the transformer. In the invention, it is possible to interconnect, to isolate, and to ground the transformer by using a single disconnector included in the switchgear.

BRIEF DESCRIPTION OF THE DRAWING

Other characteristics and advantages of the invention appear on reading the following description of an embodiment of the invention given with reference to the drawing, in which:

the sole FIGURE is a block diagram of switchgear of the invention.

MORE DETAILED DESCRIPTION

As shown in the sole FIGURE, a power station generator 1 is connected to a transformer 5 of a medium voltage and high voltage network via switchgear which includes a generator circuit breaker 3. The power station generator is of the gas turbine type or of the combined gas and steam turbine type, and it includes sets of busbars, each of which is constituted by three conductors surrounded by three metal casings, into which respective ones of three phases of the generator circuit breaker are inserted. The generator circuit breaker is of the type comprising equipment disposed in a metal casing filled with a dielectric gas under pressure. The circuit-breaker has a closed position referenced 3A and an open position referenced 3B.

A disconnector 4 is connected between the generator circuit breaker 3 and the transformer 5. A fixed pole 4E of the disconnector is connected to a moving contact 4F which is displaced into an open first position referenced 4B to open the disconnector, or into a closed second position 4A to close said disconnector. The moving contact is displaced into a third position referenced 4C to connect the fixed pole to a ground terminal 4G.

In the invention, the pole 4E of the disconnector of the switchgear is connected to the transformer 5. Under operating conditions, the generator circuit breaker 3 and the disconnector 4 are closed. Prior to starting any work on the transformer 5, e.g. for maintenance purposes, the generator circuit breaker 3 is opened, the disconnector 4 is subsequently opened, and a network circuit breaker (not shown in the sole FIGURE) is then opened. The transformer is isolated. To discharge it, the fixed pole 4E of the disconnector is connected to the ground terminal 4G via the moving contact 4F.

What is claimed is:

1. A switchgear disposed between a power station generator and a transformer of a medium voltage or high voltage network, said switchgear comprising:
   a generator circuit breaker;
   a disconnector connected between the generator circuit breaker and the transformer, the disconnector having a stationary pole connected to the transformer with a moving contact mounted to pivot on said stationary pole for performing opening, closing, and grounding positions, the transformer being connected to a ground terminal in the grounding position of the disconnector.

* * * * *